(12) United States Patent
Butterworth

(10) Patent No.: US 7,203,214 B2
(45) Date of Patent: Apr. 10, 2007

(54) OFF-PEAK OPTICAL PUMPING OF YTTRIUM ORTHOVANADATE

(75) Inventor: Stuart David Butterworth, San Jose, CA (US)

(73) Assignee: Coherent, Inc., Santa Clara, CA (US)

( * ) Notice: Subject to any disclaimer, the term of this patent is extended or adjusted under 35 U.S.C. 154(b) by 272 days.

(21) Appl. No.: 11/081,224

(22) Filed: Mar. 16, 2005

(65) Prior Publication Data

US 2005/0157771 A1 Jul. 21, 2005

Related U.S. Application Data

(63) Continuation of application No. 10/327,410, filed on Dec. 20, 2002, now Pat. No. 6,898,231.

(60) Provisional application No. 60/428,049, filed on Nov. 21, 2002.

(51) Int. Cl.
*H01S 3/13* (2006.01)
*H01S 3/14* (2006.01)
*H01S 3/092* (2006.01)

(52) U.S. Cl. ................. 372/39; 372/29.021; 372/71

(58) Field of Classification Search ........... 372/29.021, 372/39, 71
See application file for complete search history.

(56) References Cited

U.S. PATENT DOCUMENTS 5,638,397 A 6/1997 Nighan et al. ............... 372/92

5,844,149 A 12/1998 Akiyoshi et al. ........ 73/864.81
5,907,570 A 5/1999 Nighan et al. .............. 372/41

(Continued)

FOREIGN PATENT DOCUMENTS

JP 04137775 5/1992

OTHER PUBLICATIONS

P.J. Hardman et al., "Energy-Transfer Upconversion and Thermal Lensing in High-Power End-Pumped Nd:YLF Laser Crystals," *IEEE Journal of Quantum Electronics*, vol. 35, No. 4, Apr. 1999, pp. 647-655.
M. Pollnau et al., "Upconversion-induced heat generation and thermal lensing in Nd:YLF and Nd:YAG," *Physical Review B (Condensed Matter)*, vol. 58, No. 24, Dec. 15, 1998, pp. 16076-16092.
Q. Mingxin et al., Performance of a Nd:YVO$_4$ microchip laser with continuous-wave pumping at wavelengths between 741 and 825 nm, *Applied Optics*, vol. 32, No. 12, Apr. 20, 1993, pp. 2085-2086.
G. Martel et al., "Experimental and theoretical evidence of pump-saturation effects in low power end-pumped Nd:YVO$_4$ microchip laser," *Optics Communications*, vol. 185 (2000), pp. 419-430.
M. Tsunekane et al., "High power operation of diode-end pumped Nd:YVO$_4$ laser using composite rod with undoped end," *Electronics Letters*, vol. 32, No. 1, Jan. 4, 1996, pp. 40-42.

*Primary Examiner*—Armando Rodriguez
(74) *Attorney, Agent, or Firm*—Stallman & Pollock LLP

(57) ABSTRACT

A laser includes an Nd:YVO4 crystal end-pumped with diode-laser light having a wavelength at which the absorption coefficient for Nd:YVO4 is less than about 0.35 (35%) of the absorption coefficient at 808 nm.

11 Claims, 2 Drawing Sheets

814 nm ≤ $\lambda_2$ ≤ 821 nm

U.S. PATENT DOCUMENTS

| | | | |
|---|---|---|---|
| 6,026,101 A | 2/2000 | Suzudo et al. | 372/22 |
| 6,185,235 B1 | 2/2001 | Cheng et al. | 372/39 |
| 6,185,236 B1 | 2/2001 | Eichenholz et al. | 372/41 |
| 6,246,706 B1 | 6/2001 | Kafka et al. | 372/24 |
| 6,347,101 B1 | 2/2002 | Wu et al. | 372/18 |
| 6,421,573 B1 | 7/2002 | Kafka et al. | 700/121 |
| 6,483,858 B1 | 11/2002 | Hovater et al. | 372/18 |
| 6,504,858 B2 | 1/2003 | Cheng et al. | 372/39 |
| 6,570,902 B2 | 5/2003 | Peressini | 372/72 |
| 6,661,568 B2 | 12/2003 | Hollemann et al. | 359/333 |
| 6,671,305 B2 | 12/2003 | Knights et al. | 372/92 |
| 6,707,838 B2 | 3/2004 | Tani et al. | 372/92 |
| 6,714,569 B2 | 3/2004 | Zhu et al. | 372/22 |
| 6,757,310 B2 | 6/2004 | Lai | 372/39 |

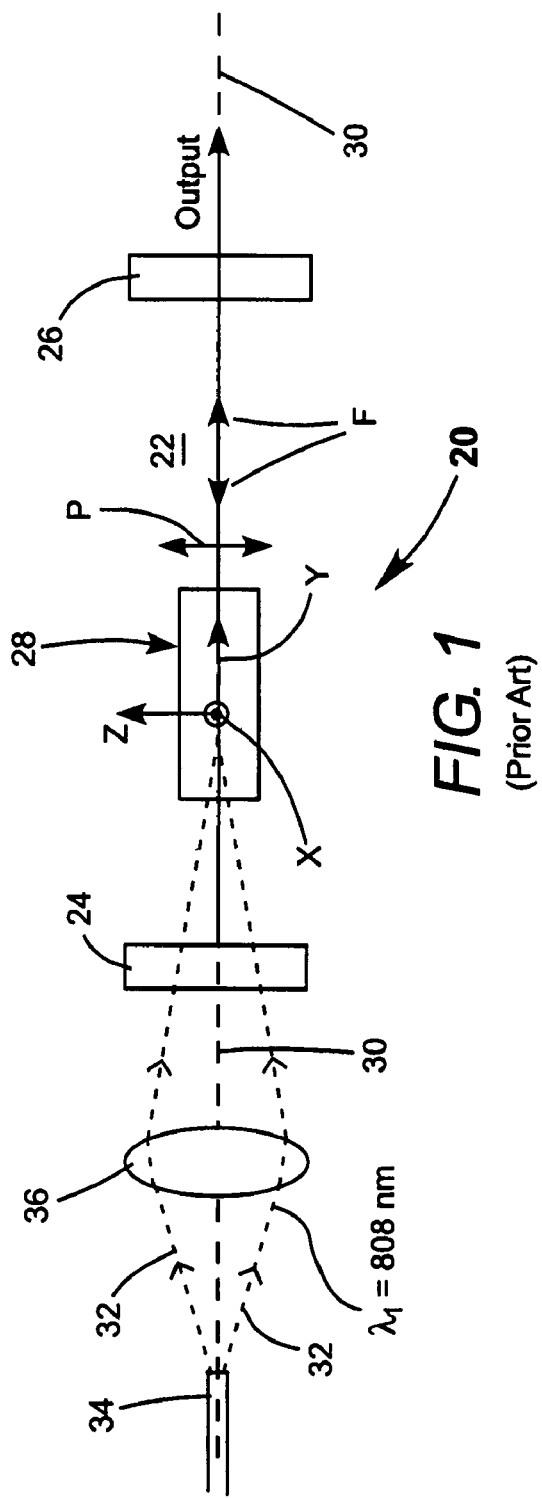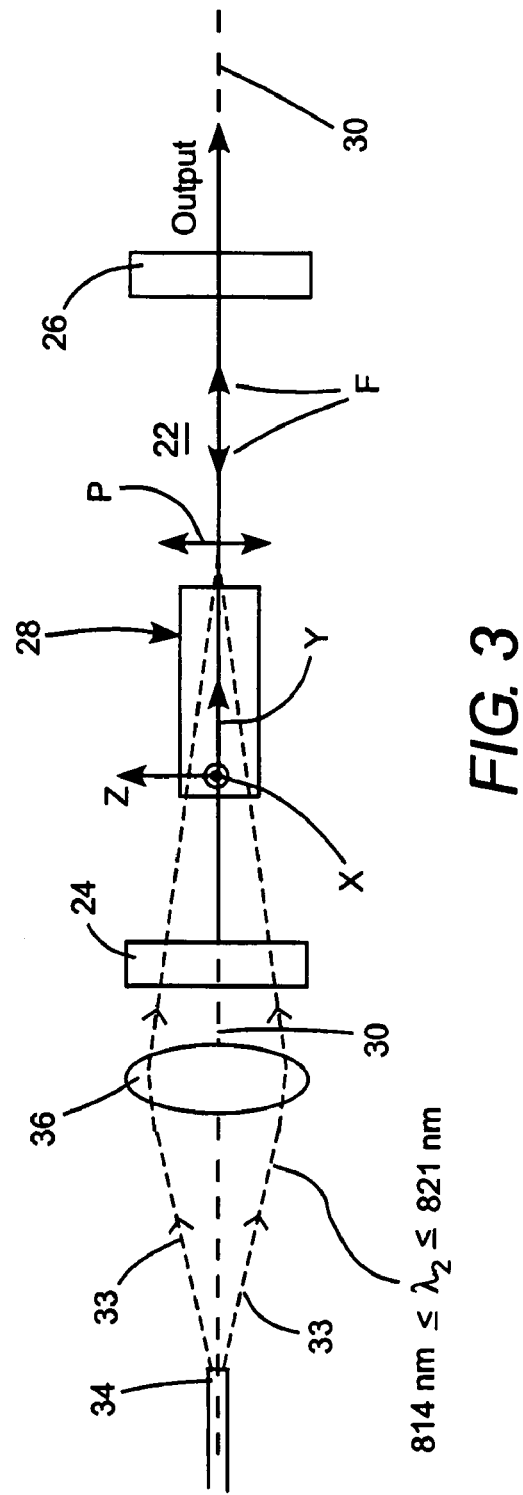

OFF-PEAK OPTICAL PUMPING OF YTTRIUM ORTHOVANADATE

PRIORITY

This application is a continuation of U.S. patent application Ser. No. 10/327,410, filed Dec. 20, 2002 now U.S. Pat. No. 6,898,231 and claims priority from U.S. Provisional Application Ser. No. 60/428,049, filed Nov. 21, 2002 and incorporated herein by reference.

TECHNICAL FIELD OF THE INVENTION

The present invention relates generally to optically pumping a neodymium-doped yttrium orthovanadate (Nd:YVO$_4$) gain-medium to generate laser radiation in a laser resonator including that gain-medium. The invention relates in particular to end pumping an Nd:YVO$_4$ rod or crystal with diode-laser radiation having a wavelength for which the absorption in Nd:YVO$_4$ is less than the absorption at the peak-absorption wavelength of about 808 nm.

DISCUSSION OF BACKGROUND ART

Nd:YVO$_4$, frequently referred to by practitioners simply as yttrium vanadate, is a preferred gain-medium for generating fundamental laser radiation at a wavelength of about 1064 nanometers (nm). The fundamental radiation can be used directly or frequency converted to provide second and higher harmonic wavelengths. The radiation can also be converted to non-harmonic wavelengths in an optical parametric oscillator arrangement (OPO) or the like. Yttrium vanadate is typically optically pumped by radiation from a diode-laser or an array of diode-lasers emitting radiation at a wavelength of about 808 nm which is a wavelength of peak absorption in Nd:YVO$_4$. The optical pump-radiation is absorbed by the yttrium vanadate gain-medium, thereby energizing electrons of the gain-medium to an excited state. The excited-state electrons subsequently release energy acquired from the optical pumping as the fundamental laser radiation. Some proportion of the pump radiation energy absorbed by the gain-medium does not contribute to energizing electrons and heats the crystal.

A yttrium vanadate crystal is a tetragonal crystal having mutually perpendicular X, Y, and Z (alternatively, a, b, and c) crystalline axes. Yttrium vanadate crystals for use as optical-gain elements in lasers are usually cut from a much larger crystal boule of the material. The boule is usually grown by a Czochralski method with the boule growing along the Z-axis. Discs are sliced from the boule perpendicular to the Z-axis (growth direction) and the discs are cut into rectangular parallelepipeds for use as gain-elements. These gain elements (crystals) are cut such that they have a longitudinal axis perpendicular to the crystal Z-axis with either the X-Z planes or the Y-Z planes parallel to the longitudinal axis and are arranged such that when placed in a laser resonator, laser radiation propagates through the crystal in a X-Y plane perpendicular to the Z axis.

One preferred arrangement for optically pumping yttrium vanadate with diode-laser radiation is referred to by practitioners of the art as "end-pumping". In end-pumping, optical pump radiation is delivered to the crystal generally along an axis aligned with the propagation axis (the resonator axis) of the laser radiation in the laser resonator. This method is preferred as it provides for efficient matching of the optical pump light with the mode volume of laser radiation propagating through the crystal. This optimizes efficiency of the laser and contributes to optimizing the quality of a beam of laser radiation delivered by the laser.

It has been found that in this end-pumping arrangement, yttrium vanadate crystals have a tendency to crack through the crystal or break completely during operation. This tendency becomes more evident as pump power into a given mode volume is increase. Cracking and breaking, however, can occur at a pump power less that what is contemplated as an optimum level or after a very short period of operation, if not immediately. This can create problems, inter alia, in providing an efficient laser, in limiting the maximum power that can reliably be extracted from a given laser design, or increasing material and manufacturing costs for a commercial supplier of yttrium vanadate based lasers.

It is believed that one explanation for the cracking tendency of the yttrium vanadate crystals is to be found in the manner in which pump light is absorbed in a crystal in a typical prior art pumping arrangement. One such prior art pumping arrangement is depicted in FIG. 1. Here, a laser 20 includes a laser resonator 22 terminated by mirrors 24 and 26. Resonator 22 includes an yttrium vanadate crystal 28. Resonator 22 has a longitudinal axis 30. An Nd:YVO$_4$ crystal 28 is arranged in resonator 22 with the Z axis of the crystal aligned with resonator axis 30. Mirror 24 is coated for maximum reflection at the lasing wavelength and for maximum transmission at the pump light wavelength. Mirror 26 is partially transmitting at the lasing wavelength for coupling laser radiation out of resonator 22.

Pump light 32 for optically pumping crystal 28 is supplied by a diode laser array (not shown) via an optical fiber 34. Pump light 32 is unpolarized as a result of traveling through optical fiber 34. Typically the pump light has a wavelength of 808 nm. Nd:YVO$_4$ has a strong absorption peak at this wavelength. The pump light is focused by a lens 36, through mirror 24, into yttrium vanadate crystal 28. Laser radiation generated as a result of the optical pumping circulates in resonator 22 along longitudinal axis 30 thereof as indicated by arrows F. The laser radiation is plane polarized in the Y-Z plane of the crystal as indicated by arrows P. Radiation F leaves resonator 22, via mirror 26, as output radiation.

Typically, pump light 32 is absorbed in the first one or two millimeters (mm) of the crystal and is concentrated in a circle of between about 800 and 900 micrometers (μm) about the Y-axis, or the X-axis depending on the crystal cut. This concentrated absorption causes a radial stress near the end of the crystal that can be sufficiently large that the crystal breaks (cleaves) along the X-Y plane. A more detailed description of his cleavage mechanism is provided in co-pending U.S. application Ser. No. 10/051,215, filed Jan. 18, 2002, assigned to the assignee of the present invention, the complete disclosure of which is hereby incorporated by reference. There is a need for an end pumping arrangement for yttrium vanadate crystals that can reduce the tendency of the crystals to cleave as a result of stresses imposed by strong optical pumping.

SUMMARY OF THE INVENTION

The present invention is directed to reducing thermal stresses in Nd:YVO$_4$ crystals or rods as a result of end pumping with light at the peak-absorption wavelength of about 808 nm. The result is achieved by optically end-pumping at a wavelength at which the absorption is less than about 0.35 (35%) of the absorption at 808 nm. A preferred wavelength range is between about 814 and 825 nm.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

FIG. 1 schematically illustrates a prior-art laser having a resonator including an Nd:YVO$_4$ crystal as a gain element, the gain element being end pumped by unpolarized light having a wavelength of 808 nm.

FIG. 3 schematically illustrates a laser in accordance with the present invention similar to the laser of FIG. 1, but with the Nd:YVO$_4$ gain element being end pumped by unpolarized light having a wavelength in a wavelength range between 814 nm and 821 nm.

DETAILED DESCRIPTION OF THE INVENTION

Figure 2:
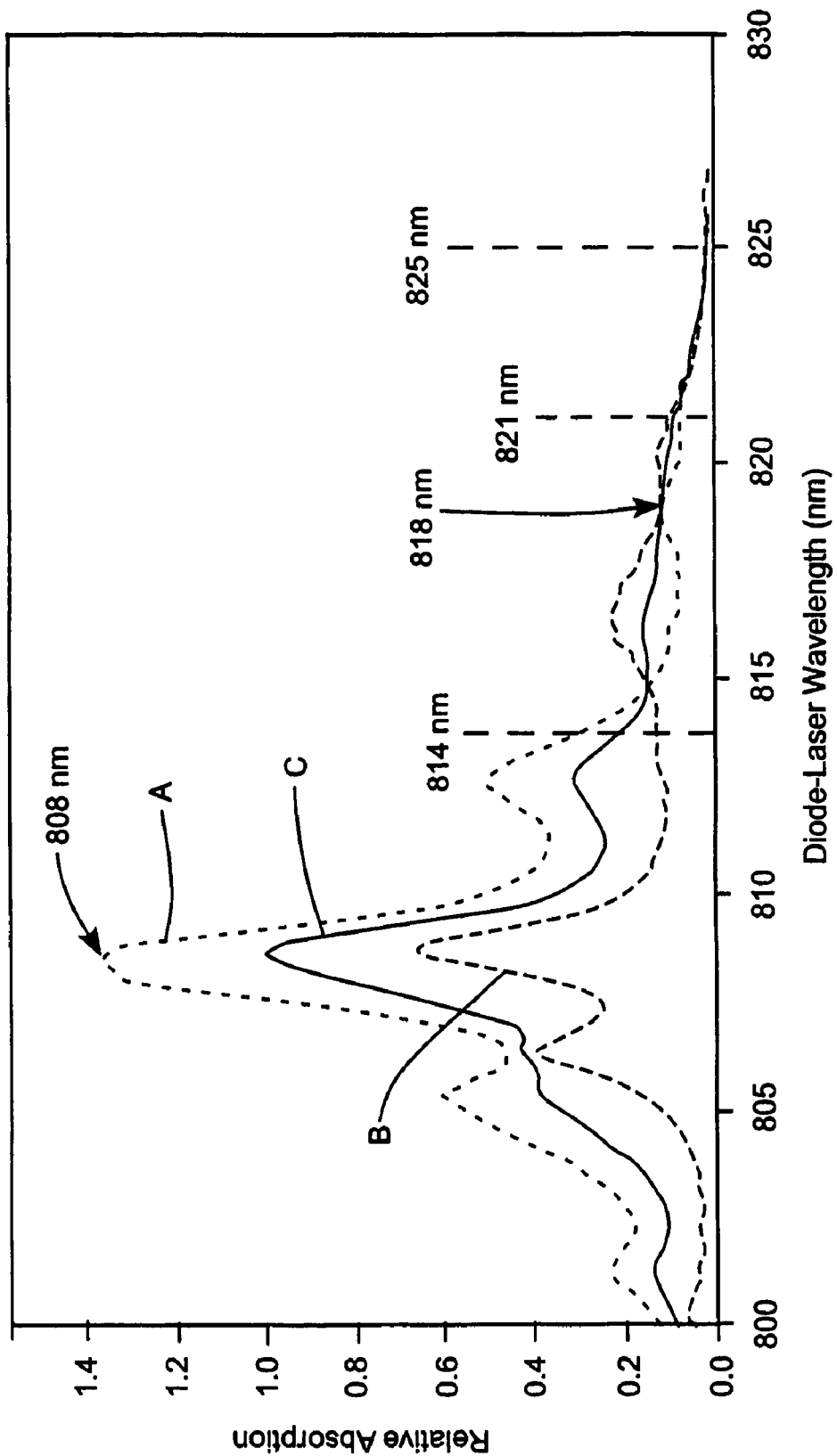
FIG. 2 is a graph schematically illustrating absorption as a function of wavelength and polarization orientation for Nd:YVO$_4$ in a wavelength range between 800 and 830 nm.

As discussed above, neodymium-doped yttrium vanadate has a strong absorption peak at a wavelength of about 808 nm. This is graphically depicted in FIG. 2 wherein curves A, B and C depict the relative absorption as a function of wavelength for Nd:YVO$_4$ in a wavelength range between 800 nm and 830 nm. Curves A and B depict respectively the relative π and σ absorption coefficients of the NdYVO4, i.e., the relative absorption coefficients for light plane-polarized respectively parallel and perpendicular to the Z axis of an Nd:YVO$_4$ crystal. Curve C depicts the average of curves A and B and, accordingly, corresponds to the relative absorption as a function of wavelength for unpolarized light.

Curves A, B and C have a strong relatively narrow absorption peak at a wavelength of about 808 nm. This wavelength, as discussed above, is the wavelength at which prior art diode pumped Nd:YVO$_4$ lasers are typically optically pumped. It can be seen that, at the 808 nm wavelength, the π absorption coefficient is more than twice the σ absorption coefficient. In a Nd:YVO4 crystal optically pumped by unpolarized light, this difference in the absorption coefficients creates a differential stress in the crystal that can lead to cracking or even cleavage of the crystal.

Referring now to FIG. 3, with continuing reference to FIG. 2, one preferred embodiment of an end pumped Nd:YVO$_4$ laser 40 in accordance with the present invention, is similar to laser 20 of FIG. 1, with an exception that Nd:YVO$_4$ crystal 28 is optically pumped by unpolarized light 33 having a wavelength in a range between about 814 and 825 nm. It can be seen that in this wavelength range the absorption coefficient for unpolarized light (curve C) is a relatively slowly varying function of wavelength having a nominal value about one-fifth that at the 808 nm peak. Furthermore, within this range there is a lesser range between about 816 and 820 nm, in which π and σ absorption coefficients are of similar magnitude and also vary relatively slowly with wavelength. A preferred pump light wavelength in this range is 818 nm. At this wavelength, the π and σ absorption coefficients are about equal.

As the relative absorption coefficient of Nd:YVO$_4$ for unpolarized light in the 814 nm to 825 nm wavelength range is about one-fifth that at 808 nm, pump light 33 can penetrate about five times further into the crystal (for the same Nd doping percentage) than 808 nm pump light 32 of FIG. 1. Accordingly, at the same pump power the thermal load on crystal 28 is spread over a much larger volume of the crystal using 818 nm-wavelength pump light 33 than it would be using 808 nm-wavelength pump light 32. This significantly reduces the radial stress in crystal 28 and correspondingly reduces the possibility of cleavage.

It is believed that if an Nd:YVO$_4$ crystal is pumped with light at any wavelength at which absorption in the crystal for any polarization state is less than about 35% of the peak value for that polarization state, the crystal will be subjected to significantly less stress than were the crystal pumped with light at the wavelength of peak absorption. The power output resulting from the pumping will, of course, depend, on the crystal dimensions, the Nd (doping) concentration in the crystal, and the resonator configuration in which the crystal is located, among other factors.

Preferably, the crystal length is arranged to be sufficient that all of the pump-light is absorbed therein. By way of example, a crystal is of 5 mm or greater is preferred. The crystal length may be reduced by providing partially retroreflective ends thereon such that pump-light traverses the crystal axially in opposite directions.

The off-peak-absorption Nd:YVO$_4$ pumping method of the present invention is described above, for convenience of description in the context of a simple, straight, standing-wave laser resonator. The inventive method is equally applicable, however, to end-pumping Nd:YVO$_4$ in any resonator, including multiply folded resonators and traveling-wave resonators as well as standing-wave resonators. The resonators may be CW resonators, or pulsed resonator operated in a Q-switched or passively-modelocked mode. As such resonators are well-known in the art, a detailed description thereof is not presented herein.

In one experiment, an Nd:YVO$_4$ crystal having an Nd ion concentration of 0.5% (a 0.5%-doped Nd:YVO$_4$ crystal) having a length of about 9 millimeters (mm) and a cross-section of about 15 mm$^2$ in a linear resonator cracked when pumped with at each end with 22 Watts (W) of unpolarized 808 nm radiation. This limited the average power output of the resonator at a wavelength of 1064 nm to about 20 W. A Nd:YVO$_4$ crystal of the same dimensions, in the same resonator, could be pumped continuously without damage with unpolarized 816 nm radiation at a power of up to 35 W at each end, providing an output power at 1064 nm of about 32 W. It was observed that thermal lensing in the crystal when pumped at 816 nm was about a factor of two less than the thermal lensing when pumped with 808 nm radiation.

It should be noted here that the off-peak-absorption Nd:YVO$_4$ pumping method of the present invention is not limited to Nd:YVO$_4$ crystals having an Nd ion concentration of 0.5%. The inventive method is equally applicable to crystals having an Nd ion concentration of 0.5% or greater, or having an Nd ion concentration of less than 0.5%. The lower Nd ion concentration has been used in prior-art 808 nm pumped Nd:YVO$_4$ lasers to avoid loss of efficiency due to parasitic self up-conversion fluorescence effects at high pump-powers. These effects are particularly problematical in lasers that operate by storing energy in a gain-element, for example, Q-switched or modelocked lasers.

In the above-described experiment, no loss of efficiency was noted when pump power was increased from 44 W total (2×22W) to 70 W total (2×35W). Accordingly, it is believed that the off-peak-absorption Nd:YVO$_4$ pumping method of the present invention also provides a method for avoiding loss of efficiency due to parasitic up-conversion effects, independent of thermal effects and independent of the polarization state of the pump-light.

The present invention is described above in terms of a preferred and other embodiments. The invention is not limited, however, to the embodiments described and depicted herein. Rather, the invention is limited only by the claims appended hereto.

What is claimed is:

1. A laser comprising:
a laser resonator including a gain element of Nd:YVO4 having a length of at least 5 mm, said gain element being end-pumped and wherein the pump-light has a wavelength selected to be different from the peak absorption wavelength of the gain element and falling between about 814 and 825 nanometers in order to reduce thermal stresses and breakage of the gain element, such that the pump source can be operated to deliver greater than 22 Watts of power to the gain medium.

2. The laser of claim 1, wherein said pump-light is unpolarized.

3. The laser of claim 1, wherein pump light is delivered to the gain medium with at least one optical fiber.

4. The laser of claim 1, wherein said gain-element has a doping concentration of 0.5% or less.

5. The laser of claim 1, wherein said gain-element has a doping concentration of 0.5% or greater.

6. A laser as recited in claim 1, wherein the wavelength of the pump source falls between 814 and 820.

7. A laser:
a laser resonator including a gain element of Nd:YVO4 having a length of at least 5 mm, said gain element being end-pumped with pump-light delivered thereto via at least one optical fiber and wherein the pump-light has a wavelength selected to be different from the peak absorption wavelength of the gain element and falling between about 814 and 820 nanometers in order to reduce thermal stresses and breakage of the gain element, such that the pump source can be operated to deliver greater than 22 Watts of power to the gain medium.

8. The laser of claim 7, wherein said pump-light is unpolarized.

9. The laser of claim 7, wherein said gain-element has a doping concentration of 0.5% or less.

10. The laser of claim 7, wherein said gain-element has a doping concentration of 0.5% or greater.

11. A laser comprising:
a laser resonator including a gain element of Nd:YVO4 having a length of at least 5 mm, said gain element having a doping concentration of 0.5% or greater and being end-pumped with pump-light delivered thereto via one or more optical fibers, said pump-light being unpolarized on delivery from said one or more optical fibers, the pump-light having a wavelength selected to be different from the peak absorption wavelength of the gain medium and falling between about 814 and 820 nanometers in order to reduce differential stresses and breakage of the gain element, such that the pump source can be operated to deliver greater than 22 Watts of power to the gain medium.

* * * * *